US012672601B2

(12) United States Patent
Reusch et al.

(10) Patent No.: US 12,672,601 B2
(45) Date of Patent: Jul. 7, 2026

(54) METHOD AND SYSTEM FOR PROVIDING A SITE SPECIFIC FERTILIZER RECOMMENDATION

(71) Applicant: Yara International ASA, Oslo (NO)

(72) Inventors: Stefan Reusch, Dülmen (DE); Jörg Jasper, Dülmen (DE)

(73) Assignee: YARA INTERNATIONAL ASA, Oslo (NO)

( * ) Notice: Subject to any disclaimer, the term of this patent is extended or adjusted under 35 U.S.C. 154(b) by 314 days.

(21) Appl. No.: 18/699,145

(22) PCT Filed: Oct. 5, 2022

(86) PCT No.: PCT/EP2022/077668
§ 371 (c)(1),
(2) Date: Apr. 5, 2024

(87) PCT Pub. No.: WO2023/057498
PCT Pub. Date: Apr. 13, 2023

(65) Prior Publication Data
US 2025/0234798 A1     Jul. 24, 2025

(30) Foreign Application Priority Data
Oct. 7, 2021     (EP) .................................... 21201463

(51) Int. Cl.
*A01C 21/00*     (2006.01)
*G06Q 50/02*     (2012.01)
*G06V 20/10*     (2022.01)

(52) U.S. Cl.
CPC ........... *A01C 21/007* (2013.01); *G06Q 50/02* (2013.01); *G06V 20/188* (2022.01)

(58) Field of Classification Search
CPC ..... A01C 21/007; A01C 21/005; A01C 21/00; A01C 21/002
See application file for complete search history.

(56) References Cited

U.S. PATENT DOCUMENTS

| | | | |
|---|---|---|---|
| 6,205,707 B1 | 3/2001 | Salopelto | |
| 7,058,197 B1 | 6/2006 | McGuire | |
| 9,195,891 B2 | 11/2015 | Scharf | |
| 11,406,071 B2 * | 8/2022 | Rowan | ................ G06Q 10/063 |

(Continued)

FOREIGN PATENT DOCUMENTS

| | | |
|---|---|---|
| CN | 103886213 A | 6/2014 |
| CN | 109919395 A | 6/2019 |

(Continued)

OTHER PUBLICATIONS

International Search Report and Written Opinion issued in App. No. PCT/EP2022/077668, dated Jan. 25, 2023, 14 pages.

(Continued)

*Primary Examiner* — Jamie L McGowan
(74) *Attorney, Agent, or Firm* — DILWORTH IP, LLC

(57) ABSTRACT
A system and method for adjusting a fertilizer recommendation for an agronomic field based on remote sensing and the determination of a position dependent yield for adjusting it. In different embodiments, different approaches for a nutrient specific fertilizer recommendation adjustment are envisaged, including the selection of a fertilizer product.

15 Claims, 3 Drawing Sheets

(56)          References Cited

U.S. PATENT DOCUMENTS

| | | | |
|---|---|---|---|
| 2017/0228475 A1 * | 8/2017 | Aldor-Noiman ... | G06V 10/7715 |
| 2018/0060975 A1 * | 3/2018 | Hassanzadeh ... | G06Q 10/06314 |
| 2018/0211156 A1 * | 7/2018 | Guan ................. | G06Q 10/06 |
| 2018/0349520 A1 * | 12/2018 | Bhalla ............... | G06Q 10/0631 |
| 2019/0075727 A1 * | 3/2019 | Duke ................. | G01N 33/02 |
| 2019/0347836 A1 * | 11/2019 | Sangireddy ......... | G06Q 50/02 |
| 2021/0015024 A1 * | 1/2021 | Sauder .............. | A01G 7/06 |
| 2024/0193707 A1 * | 6/2024 | Lefley ............. | G06Q 10/06393 |
| 2025/0068788 A1 * | 2/2025 | Hanebrink ........... | G06Q 50/02 |

FOREIGN PATENT DOCUMENTS

| | | |
|---|---|---|
| CN | 110069877 A | 7/2019 |
| CN | 110222870 A | 9/2019 |
| CN | 112667955 A | 4/2021 |
| CN | 112889007 A | 6/2021 |
| EP | 0813807 | 12/1997 |
| EP | 3821688 | 5/2021 |

OTHER PUBLICATIONS

International Preliminary Report on Patentability issued in App. No. PCT/EP2022/077668, dated Jun. 30, 2023, 19 pages.
Office Action and Search Report received for Chinese Application No. 202280064742.3, mailed on Aug. 16, 2025, 22 pages (10 pages of original office action and 12 pages of English Translation).

* cited by examiner

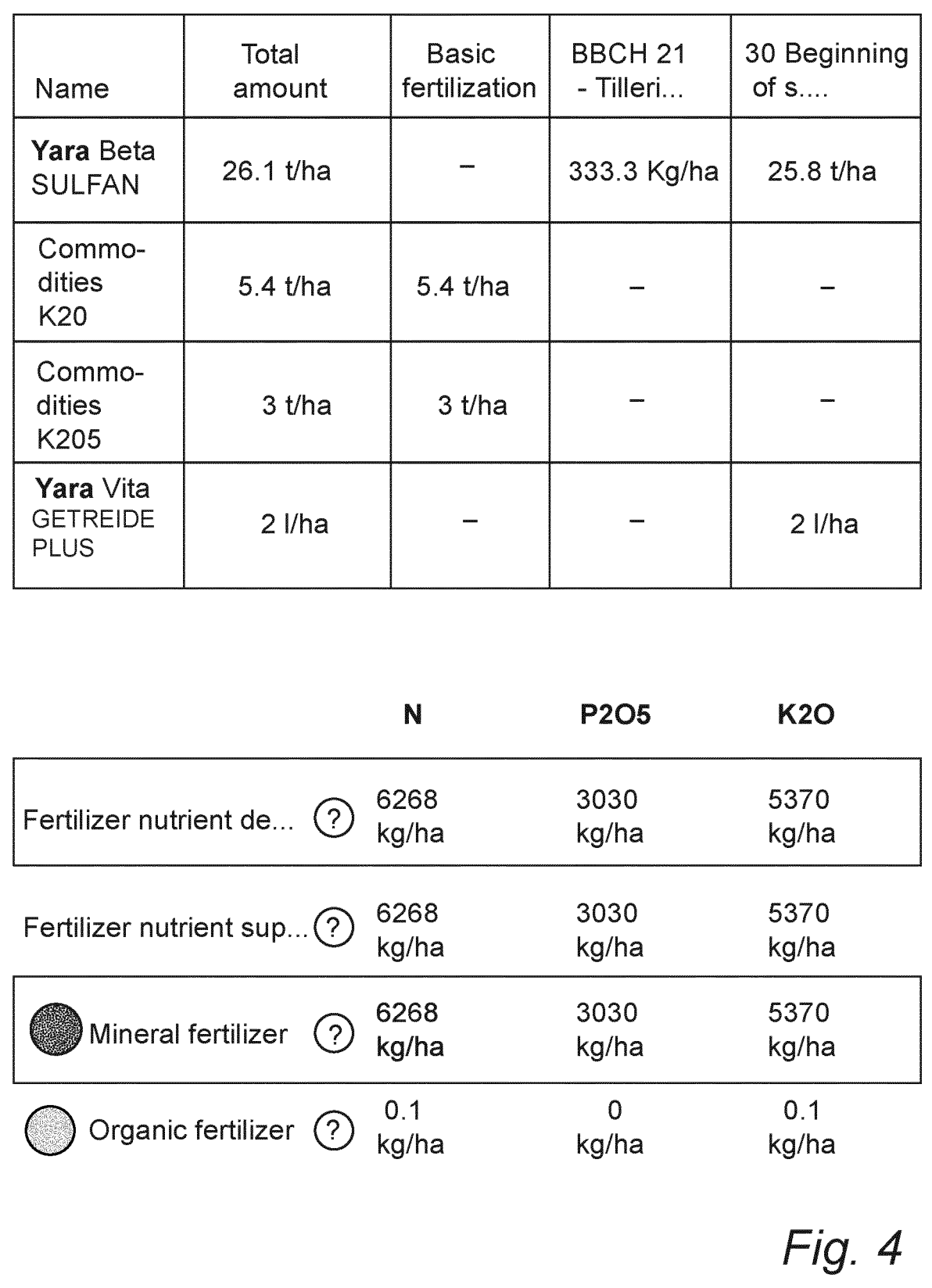

| Name | Total amount | Basic fertilization | BBCH 21 - Tilleri... | 30 Beginning of s.... |
|---|---|---|---|---|
| Yara Beta SULFAN | 26.1 t/ha | – | 333.3 Kg/ha | 25.8 t/ha |
| Commo-dities K20 | 5.4 t/ha | 5.4 t/ha | – | – |
| Commo-dities K205 | 3 t/ha | 3 t/ha | – | – |
| Yara Vita GETREIDE PLUS | 2 l/ha | – | – | 2 l/ha |

|  | N | P2O5 | K2O |
|---|---|---|---|
| Fertilizer nutrient de... (?) | 6268 kg/ha | 3030 kg/ha | 5370 kg/ha |
| Fertilizer nutrient sup... (?) | 6268 kg/ha | 3030 kg/ha | 5370 kg/ha |
| ● Mineral fertilizer (?) | 6268 kg/ha | 3030 kg/ha | 5370 kg/ha |
| ○ Organic fertilizer (?) | 0.1 kg/ha | 0 kg/ha | 0.1 kg/ha |

*Fig. 4*

METHOD AND SYSTEM FOR PROVIDING A SITE SPECIFIC FERTILIZER RECOMMENDATION

TECHNICAL FIELD

The present disclosure relates to a system and method for providing a variable fertilizer recommendation to crops in agricultural fields.

BACKGROUND

Determining the appropriate amount of fertilizer a crop needs is one of the most important decisions a farmer will encounter. A deficit in nitrogen will reduce yield, while an excess will produce economic losses and damage the environment. A deficit in other nutrients will lead to crop defects and reduced crop quality. Crops, however, present an in-field variability due to the variance in parameters which influence the growth and development of a crop (water, soil properties) and is therefore cumbersome to establish a location dependent fertilizer recommendation which might suit the whole crop at optimum levels.

Amongst the different methods for estimating crop nutrient levels in crops, the use of remote imagery generated by satellites or other equivalent unmanned aerial vehicles has gained importance in the actual field due to the readily available solutions from different providers. Remote sensing allows determination of crop nitrogen levels of remote fields without the need of in-field inspection. However, the use of remote imagery entails well-known disadvantages. Moreover, remote methods do not get to assess other parameters dependent of soil varying properties and long-term dynamics in the agricultural field. Hence an integrated solution based on remote sensing which takes further in-field variations caused by soil dynamics into account is intended.

PRIOR ART

Examples of fertilization recommendation can be seen in U.S. Pat. No. 9,195,891 B2, wherein a method of predicting crop yield loss due to n-deficiency is disclosed, has however no consideration of long-term dynamics present in the agronomical field, focusing on the nitrogen loss in the current season. Further, U.S. Pat. No. 7,058,197 B1 discloses a multi-variable model for identifying crop response zones in a field and the needed normalization procedures required when comparing remote imagery obtained at different points in time, but needs a multi-variable model with the corresponding computational effort it requires.

SUMMARY

It is an object of the current disclosure to establish a method for providing a variable fertilizer recommendation based on a deterministic approach which overcomes the above-mentioned problems while considering in-field variability for a fertilizer recommendation and takes into consideration soil properties and long-term dynamics. Further aspects of the invention aim at providing nutrient specific adjustment of fertilizer recommendations.

According to a first aspect of the present disclosure, this and other objectives are achieved by a computer-implemented method for providing a fertilizer recommendation for a crop, the method comprising the steps of determining at least one agricultural field comprising at least one crop; determining a fertilizer recommendation for the at least one crop in the at least one agricultural field; adjusting the fertilizer recommendation for the at least one agricultural field, wherein adjusting the fertilizer recommendation for the at least one agricultural field comprises receiving position dependent yield data of the agricultural field, wherein the yield data comprises yield data from at least one prior crop season from the at least one agricultural field; processing the yield data to determine a nutrient specific correction for the fertilizer recommendation and adjusting the fertilizer recommendation based on the nutrient specific correction.

Following this approach, a fertilizer recommendation taking into account in-field variabilities due to soil properties and long-term dynamics is achieved.

According to a further embodiment, receiving position dependent yield data comprises receiving remote data comprising image data of the at least one agricultural field from at least a prior crop season; generating at least one vegetation index indicative of the crop nutrition status for the at least one prior crop season for each pixel of the image data over a predefined time; processing the at least one vegetation index over the predefined time and determining a position dependent yield for the at least one prior crop season based on the generated and processed vegetation index over the predefined time.

Following this approach, a full remote sensing method can be achieved.

According to a further embodiment, determining a fertilizer recommendation comprises obtaining the fertilizer recommendation by means of remote or local sensing.

Following this approach, any method for determining a fertilizer recommendation can be improved with the method of the current disclosure.

According to a further embodiment, processing the at least one vegetation index further comprises receiving historic weather data, and wherein a daily gross primary production value of a crop is determined based on the at least one vegetation index generated and the historic weather data and the position dependent yield is determined based on a sum of the daily gross primary production value between crop growth start and harvest time.

Following this approach, yield data is accurately determined.

According to a further embodiment, processing the yield further comprises determining abnormal yield areas within the at least one agricultural field based on the yield data, comprising determining at least one reference yield value for at least a part of the agricultural field, optionally comparing the position dependent yield data values with the at least one reference yield value, and determining the areas wherein the position dependent yield data values differ from the at least one reference yield value for the at least a part of the agricultural field by a predetermined threshold and the method further comprises determining the nutrient specific correction based on the difference between the reference yield value and the position dependent yield data.

Following this approach, under- and over-performing areas within the agricultural field can be individually addressed.

According to a further embodiment, determining at least one reference yield value further comprises evaluating yield data from a plurality of prior crop seasons, determining a season specific reference yield value for each of the prior crop seasons and determining the at least one reference yield value based on the season specific reference yield values.

Following this approach, long-term tendencies in yield can be individually and site specifically addressed.

According to a further embodiment, determining a nutrient specific correction further comprises determining the nutrient specific correction based on the absolute amount of the position dependent yield data for the at least one prior crop.

Following this approach, the nutrient removal with the at least one prior crop can be taken into consideration.

According to a further embodiment, determining the nutrient specific correction further comprises adjusting the nutrient specific correction based on the nutrient availability of different nutrients present in the soil of the at least one field.

Following this approach, soil nutrient availability can be taken into consideration.

According to a further embodiment, the method further comprises determining at least a fertilizer product based on the adjusted fertilizer recommendation.

Following this approach, an optimal product containing the specific nutrients can be determined.

According to a further embodiment, the method further comprises receiving weather data and determining at least one application date based on the weather data, the fertilizer recommendation and/or on the fertilizer product.

Following this approach, a suitable point in time for the application of the fertilizer is determined which improves the delivery of the nutrients.

According to a further embodiment, the method further comprises producing a machine-readable script file based on the adjusted fertilizer recommendation for an agricultural apparatus to carry out a corresponding fertilizer application.

Following this approach, agricultural apparatus can automatically upload the variable prescription map for application.

A method according to any of the preceding claims, wherein the method further comprises implementing the adjusted fertilizer recommendation by means of an agricultural apparatus configured to carry out a fertilizer application.

Following this approach, a variable fertilizer application following the present method is achieved.

According to a further embodiment, the agricultural apparatus may be at least one of a spreader, a sprayer or a fertigation apparatus.

Following this approach, different agricultural apparatus may be used and with them different kinds of fertilizer.

According to further aspects, a system, a data processing apparatus, a computer-readable storage medium, and a computer program product configured to carry out the above discussed methods are envisaged within the present disclosure.

BRIEF DESCRIPTION OF THE FIGURES

The accompanying drawings, which are included to provide a further understanding of the present disclosure and are incorporated in and constitute a part of this specification, illustrate embodiments of the disclosure and together with the description serve to explain the principles of the disclosure.

FIG. 4 shows an example of fertilizer products chosen according to one embodiment of the present disclosure.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. Reference will now be made in detail to several embodiments, examples of which are illustrated in the accompanying figures.

DETAILED DESCRIPTION

As used below in this text, the singular forms "a", "an", "the" include both the singular and the plural, unless the context clearly indicates otherwise. The terms "comprise", "comprises" as used below are synonymous with "including", "include" or "contain", "contains" and are inclusive or open and do not exclude additional unmentioned parts, elements or method steps. Where this description refers to a product or process which "comprises" specific features, parts or steps, this refers to the possibility that other features, parts or steps may also be present, but may also refer to embodiments which only contain the listed features, parts or steps.

The enumeration of numeric values by means of ranges of figures comprises all values and fractions in these ranges, as well as the cited end points. The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the disclosure disclosed herein. It should be understood that the value to which the term "approximately" refers per se has also been disclosed.

Unless defined otherwise, all terms present in the current disclosure, including technical and scientific terms, have the meaning which a person skilled in the art usually gives them. For further guidance, definitions are included to further explain terms which are used in the description of the disclosure.

Figure 1:
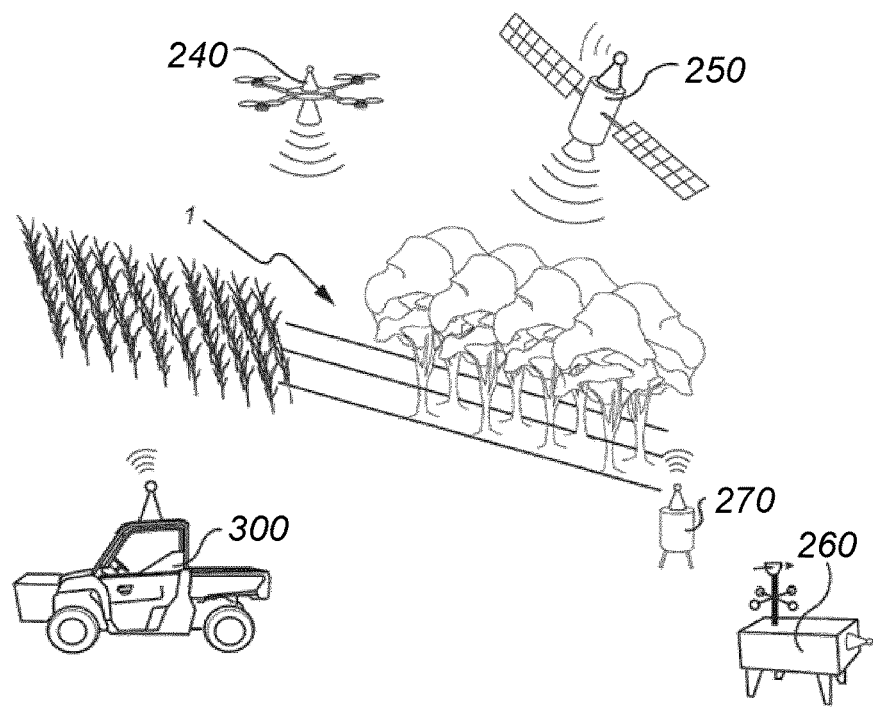
FIG. 1 shows an agricultural field according to the field of application of the present disclosure.
Figure 2:
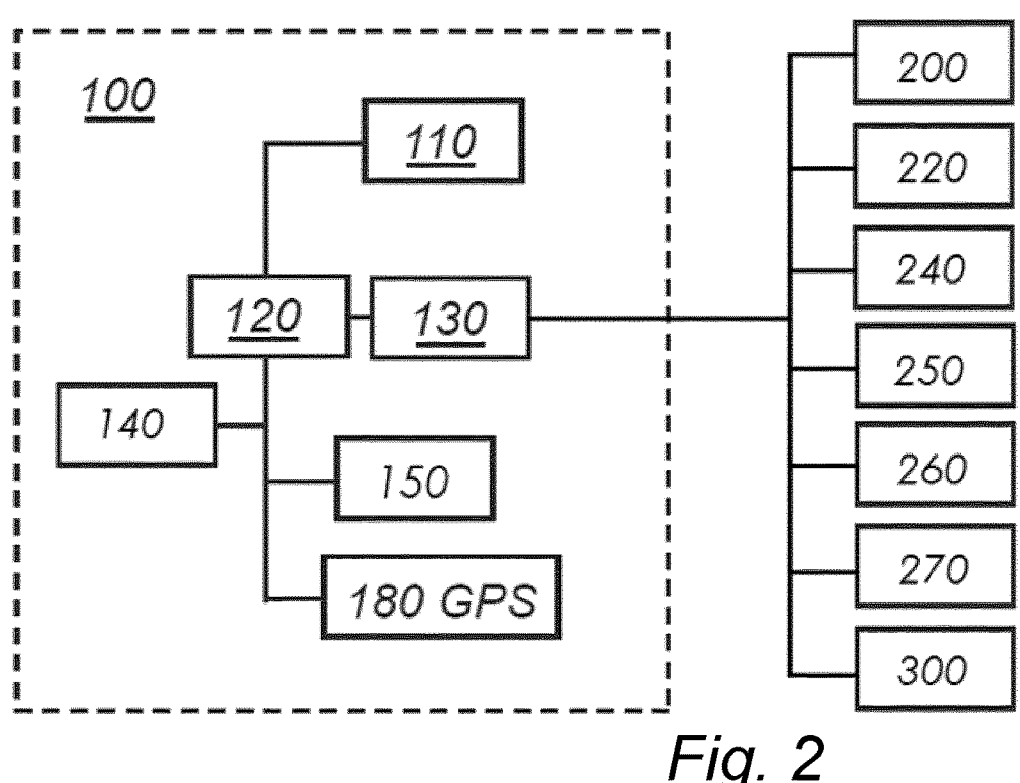
FIG. 2 shows a schematic representation of a system according to an embodiment of the present

FIG. 1 depicts an agricultural field comprising a crop within an agricultural region with other systems and apparatus with which the system 100 may interoperate. In FIG. 2, an example of a system 100 according to the present disclosure is represented. System 100, according to the present disclosure, comprises several components such as a memory unit 110, a processor 120, a wired/wireless communication unit 130, an input/output unit 140. The system 100 may as well be operatively connected with a personal or mobile device 200 by means of the communication unit 130.

System 100 comprises an agricultural recommendation engine 220 to which the system may be remotely connected by means of the communication unit 130, may it be of a remote nature. In this case, the agricultural recommendation engine 220 may be represented by a computer, a remotely accessible server, other client-server architectures or any other electronic devices usually encompassed under the term data processing apparatus. System 100 does not need to be located within the vicinities of the agricultural field where the recommendation is supposed to take place.

System 100 can be represented as well by a laptop computer or handheld device, with an integrated agricultural recommendation engine 150 which can be fully operated at the farm's location and may comprise a GPS unit 180 or any other suitable localization means, as well as a fully remote computer or server configured to establish communication with the further personal or mobile device 200 from which the users may operate the system 100.

It is to be understood that the presence of remote and integrated recommendation engines are not mutually excluding. Integrated agricultural recommendation engine 150 can be a local copy of remote agricultural recommendation engine 220 or a light version of it to support periods of low network connectivity and offline work. Further, mobile or personal device 200 is considered to be any state-of-the-art mobile computing device which allows the input and output of data by the users and comprise the usual System 100 and remote or integrated agricultural recommendation engine may comprise field and farm data and external data and/or be configured to receive said data, whereby external data comprises weather data, satellite imagery data and further data provided by weather forecast providers or other third parties. Field data may comprise amongst others current and past data of at least one of the following: field and geographic identifiers regarding the geometry of the boundaries of the agricultural field, including the presence of areas within the agricultural field which are not managed, topographic data, crop identifiers (crop variety and type, growth status, planting data and date, plant nutrition and health status) of current and past crops, harvest data (yield, value, product quality, estimated or recorded historic values), soil data (nutrient availability, type, pH, soil organic matter (SOM) and/or cation exchange capacity, CEC). Farm data may comprise further data regarding planned and past tasks like field maintenance practices and agricultural practices, fertilizer application data, pesticide application data, irrigation data and other field reports as well as historic series of the data, allowing the comparison of the data with past data, and the processing of further administrative data like work shifts, logs and other organizational data. Planned and past tasks may comprise further activities like surveillance of plants and pests, application of pesticides, fungicides or crop nutrition products, measurements of at least one farm or field parameter, maintenance and repair of ground hardware and other similar activities.

The system 100 may be configured to receive and/or retrieve soil data from available online soil databases like SoilGrids from the World Soil Information, SSURGO (Soil Survey Geographic Database from the United States Department of Agriculture) or any similar soil data repository, as well as by means of user input, wherein the user input may relate to a laboratory soil analysis carried out on the soil of the at least one agricultural field.

System 100 may be further configured to receive any of the above-mentioned data and further field data from a predetermined number of locations within or nearby the analyzed region, inputted manually by the users/farmers by means of the input/output unit 140 or received by the communication unit 130 from dedicated sensors 270. Further, system 100 and agricultural recommendation engine 220 may be configured to receive weather data from nearby weather stations 260 and/or external crop/farm sensors or sensing devices 270, as well as by means of the input unit 140. Nearby weather stations 260 and/or external crop/farm sensors 270 are configured to communicate via one or more networks. In another embodiment, weather data is provided by external weather forecast companies. Weather data may further include present and past series of data of the at least one of the following: temperatures, accumulated precipitation, relative humidity, wind speed, solar radiance, accumulated sun hours, as well as forecasts, etc.

System 100 may further be operatively connected to an agricultural apparatus 300. Examples of agricultural apparatus 300 include tractors, combines, harvesters, planters, trucks, fertilizer equipment, and any other item of physical machinery or hardware, typically mobile machinery, and which may be used in tasks associated with agriculture. In one embodiment, system 100 may be configured to communicate with the agricultural apparatus 300 by means of wireless networks in order to set a variable rate application prescription for the determined crop, or alternatively, to determine the measurement region as indicated destination. System 100 may be further configured to produce a machine-readable script file for the agricultural apparatus 300 to carry out the fertilizer application. Agricultural apparatus may further comprise a crop nutrient measuring system like the N-Sensor of Yara International ASA, contributing to the determination of the fertilizer recommendation.

Figure 3:
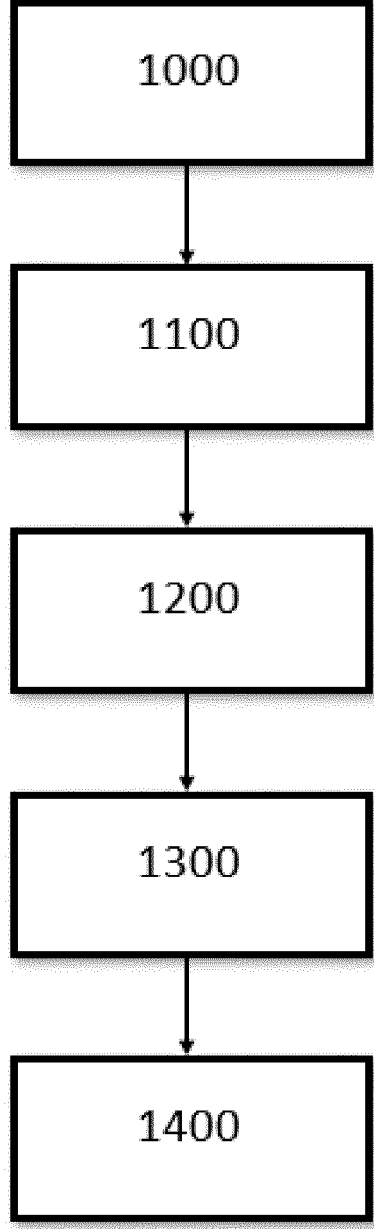
FIG. 3 shows a flowchart of the method according to an embodiment of the present disclosure.

FIG. 3 shows a flowchart representing a method according to one of the embodiments disclosed in the present application, which will be disclosed here below.

In an embodiment, the computer implemented method of the present disclosure is configured to provide 1400 a variable fertilizer recommendation for a crop, the method comprising the steps of determining 1000 at least one agricultural field comprising at least one crop. An example of how the current method may determine at least one agricultural field may be the user providing a predetermined field, but the method of the current disclosure may be configured to automatically retrieve the field for which the recommendation is intended based on farm and/or field data. The agricultural field may be determined as well based on a position of the user, which may be given by the system 100, the mobile device 200 or by the agricultural apparatus 300. In a further embodiment, system 100 is configured to determine the boundaries of the determined agricultural field may the determined field not have data regarding the boundary locations in the existing farm data.

The method of the current disclosure is further configured to determine 1100 a fertilizer recommendation for the at least one crop in the at least one agricultural field. The present application may be configured to use suitable remote data for remotely determining the crop nutrient content. In further embodiments, the fertilizer recommendation can be determined by means of crop nutrient measurement devices which determine a nitrogen uptake in the at least once crop in the at least one agricultural field by means of direct measurements. For example, without any limitation intended, the fertilizer recommendation can be determined by means of known Yara devices like the N-Sensor® or N-Tester®. The fertilizer recommendation can be a variable fertilizer recommendation wherein the amount of fertilizer across the field is variable based on the crop nutrient status or other factors related to the crop growth or merely provide a baseline value for a fertilizer recommendation by having a single value over the whole agricultural field, but the method by means of which the fertilizer recommendation is determined is not limited by the current application to the above-mentioned examples. As such, any fertilizer recommendation, be it based on the farmers experience or determined by means of local or remote sensing may be improved according to the following embodiments.

The determined fertilizer recommendation may be of a variable nature. This means that rather than specifying a uniform measure for the field, local differences in the field are taken into account in that a specific appropriate implementation of the corresponding fertilizer application is planned for the individual partial areas respectively. A variable fertilizer recommendation takes these differing requirements into account. Still, even if the determined fertilizer recommendation is provided with a constant value over the agricultural field as explained above, the method of the current disclosure may provide a variable adjusted fertilizer recommendation due to the consideration of the yield data from prior crops. Moreover, the fertilizer recommendation may comprise specific corrections for one or a plurality of nutrients, wherein the amounts of nutrients to be used are adapted to the differing needs of the crop plants in different areas of the field.

In an embodiment, the fertilizer recommendation is to be determined by means of remote sensing. In this embodiment, remote data can be referred to data provided by imaging satellites 250 or suitable manned or unmanned imaging aerial vehicles 240. These satellite or vehicle systems are configured to communicate by means of dedicated networks and usual methods which do not need being disclosed herein. Amongst the different remote data available for use, satellite data is nowadays widely available from numerous public (LANDSAT from NASA, SENTINEL from ESA) and/or private providers. The present method is however not limited to a satellite data platform, since the spectral bands which can be of use for the present method are provided in a big range of the standard satellite data available publicly and privately. Due to the differences present across different satellite and optical sensor platforms, it is hereby not intended to limit the support of the current disclosure to exact and specific wavelengths and the given wavelengths are provided for orientation. While different factors and corrections can be introduced to account for these variabilities, the use of wavelengths proximate to the ones mentioned below should be understood since the specifications of said platforms vary accordingly.

In an embodiment, remote data is obtained from the Sentinel-2 satellite. The Sentinel-2 mission contains a MSI (Multi Spectral Instrument) that takes high spatial resolution data in order to monitor Earth's surface. The MSI works passively, by collecting sunlight reflected from the Earth and is therefore a more efficient and less energy consuming detection method. Sentinel-2 consists of 13 bands with different spatial resolutions (10 m, 20 m or 60 m), in the visible, near infrared, and short-wave infrared part of the spectrum. In an embodiment, the current method uses the image data related to spectral bands with at least a plurality of wavelengths comprised approximately between 700 and 850 nm. In a further embodiment, the present method uses data related to spectral bands with a wavelength of approximately 740 and 780 nm. The use of Sentinel-2 spectral bands from the MSI produces measurements with a high resolution (approx. 20 m) and is therefore preferred for the implementation of the current disclosure.

In an embodiment, remote data may comprise data relating to different spectral bands used for improving the determination of the present method. Further compensation and calibration algorithms are considered in the present application, depending on the nature and origin of the remote data.

Once the remote data has been received, the method is configured to generate at least one coefficient derived from the remote data. Different coefficients (or indexes) have been used in the literature for obtaining different agricultural information like the difference vegetation index and the normalized difference vegetation index (NDVI). However, NDVI is sensitive to the effects of soil brightness, soil color, atmosphere, clouds, cloud shadows, and leaf canopy shadows and requires remote sensing calibration. In that sense, further coefficients contemplated may comprise the Atmospherically Resistant Vegetation Index (ARVI) to reduce the dependence of atmospheric effects; the Soil-Adjusted Vegetation Index (SAVI) or the Type Soil Atmospheric Impedance Vegetation Index (TSARVI) which take into consideration the distinction of vegetation from the different types of soil background.

In one embodiment, in order to provide a reliable vegetation index or coefficient which is indicative of above ground nitrogen uptake present in the vegetation, at least one of the indexes of the application may include different wavelengths at the so-called red edge of vegetation between 670 and 800 nm.

For example, formulations of a vegetation index according to the present considerations can be expressed as: SC=$f$(R760, R730), wherein R760 and R730 represent the reflectance values of the image data relating to the respective wavelengths, or values closest to them in the respective satellite platform as explained above and f represents a suitable relation of the different wavelengths according to the intended finality. The present index is therefore sensitive to the chlorophyll content present in the vegetation and a direct relationship with the above-ground nitrogen uptake within the canopy can be directly derived. While for this example the data related to the respective wavelengths have been indicated as R760 and R730, this is just a non-limiting example indicating two suitable wavelengths for the determination of chlorophyll. As such, a generic vegetation index may be indicated as any arbitrary mathematical function based on a suitable relation of data relating to specific wavelengths, and therefore in general a vegetation index can be represented by any suitable mathematical function $f$ establishing a specific relation amongst the wavelengths, which can be then generically represented as follows:

$$SX=C_x f(RXXX_1, RXXX_2, \ldots, RXXX_n)$$

Wherein $C_x$ represents a function calibrated constant and RXXX; represent each of the wavelengths of the image data of the plurality of wavelengths use for the determination of the respective index.

In a further embodiment, in order to provide a reliable vegetation index or coefficient which is indicative of the above-ground fresh or dry matter in the vegetation, the remote data may comprise a further remote data comprising further wavelengths at or close to water absorption bands, such as around 970 nm, 1100, 1450 or 1950.

The biomass determination can be independent of chlorophyll. For example, fresh biomass can e.g. be calculated from SW=g(R900,R970), wherein, as before, R900 and R970 represent the reflectance values of the image data relating to the respective wavelengths, or values closest to them in the respective satellite platform and g represents a suitable mathematical relation of the different wavelengths. However, the list of coefficients (or indexes) is not meant to be limiting. There is a great variance of different coefficients which are as well able of being used by the present method, as mentioned above for computing other properties of agronomical fields (e.g. soil moisture) which although not directly indicative of crop nutrient content, assist the determination of a fertilizer recommendation by improving further insights into other field parameters.

Once the at least one coefficient indicative of the crop status within the agricultural field has been generated the determination of different factors like chlorophyll, nitrogen uptake and biomass amongst others may be accounted for generating a fertilizer recommendation.

In another embodiment, determining 1100 a fertilizer recommendation may be carried out by means of user input based on previous experience or with help of local sensing devices. For example, existing device like the N-Sensor can assess the crop nutrient status of the whole crop, producing variable prescription maps which can then be imported by means of existing communication networks for the system of the current invention to carry out the nutrient specific adjustments.

Within the present disclosure, a nutrient specific adjustment or correction refers to variations on the fertilizer recommendation carried out for different nutrients, i.e. corrections or adjustments are or may be different for each specific nutrient.

Other means of determining a fertilizer recommendation may comprise the user providing a variable prescription map from prior crops or manually inputting a constant value for the amount of fertilizer to be spread across the field. Usually, such recommendations come in kg/ha or t/ha. However, independently from the origin of the provided fertilizer recommendation, the used approaches cannot account for hidden factors in the infield variability or for longer term dynamics present in the field or other limitations and justify the approach of the current disclosure as it will be seen further below.

The method of the current application is further configured to adjust 1400 the fertilizer recommendation. Adjusting the fertilizer recommendation comprises receiving position dependent yield data 1200 of the agricultural field, wherein the yield data comprises yield data from at least one prior crop season from the at least one agricultural field.

Within the current disclosure, position dependent yield data refers to any yield data associated with a specific location within the agricultural field. That is, position dependent yield data may comprise a yield value associated to a unique location as defined by spatial coordinates (e.g. GPS coordinates or any other suitable location data). As it will be seen below, the position as defined within the agricultural field may be linked to a corresponding pixel (i,j) as received with the image data of the at least one agricultural field.

Receiving yield data may comprise receiving yield data from harvesting machinery or other agricultural machines present in the harvesting process by means of the field data. Receiving yield data may further comprise receiving remote data comprising image data of the at least one agricultural field from a least one prior crop season, wherein at least one coefficient (or vegetation index) indicative of the crop nutrition status is generated over at least a part of the at least one prior crop season over a predefined time.

In a further embodiment, receiving position dependent yield data may further comprise receiving an absolute yield value for the whole field of the at least one crop in the at least one agricultural field from field data or by means of a user input. In this embodiment, the method is further configured to determine 1200 a position dependent yield of the at least one prior crop season based on the yield data received and the generated vegetation index.

The current method may further comprise receiving field data comprising data about the different crop types and the crop growth start/harvest dates of the at least one prior crop, wherein the method is configured to receive the data by means of user input or by means of the communication unit 130 if the data is already present in the system as farm or field data. In a further embodiment, the method is configured to automatically determine the crop type and the start of season/end of season dates by processing the at least one generated coefficient. The current method may be further configured to automatically identify the crop type based on weather data and remote data. The current method may determine specific times for the crop growth start ($t_1$) and harvesting ($t_2$) times which define a crop season, wherein there can be different crop seasons over a natural year.

The current method may be configured to determine the specific crop growth start and harvesting times of a predetermined crop within an agricultural field by processing the at least one agricultural index generated from the remote data comprising imagery data of the at least one agricultural field from at least one prior crop season. For several crops (wheat, rye, cereals or broad acre crops in general) the start of the seasons is defined by bare soils or just cover crops. The values of vegetation indexes are therefore at a minimum at that time. Analogously, harvesting time can be determined when the vegetation index reach it maximum before dropping again.

Once the season timings are determined, either given manually by the users or automatically, the method of the current disclosure may be further configured to automatically determine the crop type. Based on calibrated crop evolution models and weather data from the at least one prior crop season, the system may be configured to determine the crop type by correlating the evolution of the at least one vegetation index with the models of the different considered crops and the received weather data.

In a further embodiment, the method being configured to determine a position dependent yield of the at least one prior crop season based on the generated vegetation index may further comprise, for each position associated to each of the generated coefficients, i.e. pixelwise, referring as $SC_{i,j}$ to the value of the position dependent vegetation index associated to a given pixel (i,j) linked to a position in the at least one agricultural field, integrating the value of the at least one generated vegetation index over the predefined time, wherein the position dependent yield is the integrated value of the at least one generated vegetation index over the predefined time, calibrated by means of the crop data.

$$Y_{i,j} = C_{crop} * \int_{t_1}^{t_2} SC_{i,j} dt$$

As such, the whole yield of an agricultural field can be defined as:

$$Y_{Field} = \sum_{i,j=1}^{n} Y_{i,j} = \sum_{i,j=1}^{n} C_{crop} * \int_{t_1}^{t_2} SC_{i,j} dt$$

Wherein $Y_{Field}$ represents the whole yield of the one field, once the yield data for each pixel in the field is added. As explained above, while yield data can be introduced into the method of the current disclosure directly with a position dependent yield based on modern harvesters with GPS and different sensing arrangements, general yield data of a field could be introduced by the user who may only know the total amount of yield obtained from the whole field. As such, following the above-mentioned equations, the total yield of a crop in a given field can as well be processed by the current method. In a further embodiment, the non-position dependent yield data (yield data for the whole field), which might have been provided by the user or present in existing farm data, is combined with remote data to establish the spatial variation of the vegetation index which in turn delivers a position-dependent crop yield value.

In a further embodiment, yield data may be determined based on historic weather data and crop data related to the prior crops. For example, based on a given crop type, a daily gross primary production value of a crop, representative of the daily crop growth, may be determined by the following equation:

$$\Delta GPP = C_{RUE} * f_{apar} * C_{PAR} * f_T;$$

Wherein $C_{RUE}$ is a constant representing the radiation use efficiency, which can be defined as a function of a given solar irradiance as received in historic weather data or approximated from a given day of the year and a given latitude, $f_{apar}$ is a fraction of absorbed photosynthetic radiation determined as a function of the existing chlorophyll pigments, $C_{PAR}$ represents the incoming photosynthetic radiation, and $f_r$ represents a temperature efficiency factor which is usually represented with quadratic relation based on the temperature values or average mean temperature for the considered day. $f_{apar}$ may be generated by processing a vegetation index of the agricultural field and in a further embodiment it may be defined as a function of a vegetation index indicative of chlorophyll presence in the crop, wherein for each pixel $f_{apar}$ may be defined as the difference between the vegetation index at that stage and the vegetation index value at times with no crop. While a full consideration of all the factors disclosed can achieve better and more precise results, subsets of the above-mentioned factors can be considered and are therefore not excluded from the current disclosure.

Based on said daily gross primary production value of a crop, the yield of a field may then further be determined as:

$$Y_{Field} = HI * \sum_{t_1}^{t_2} \Delta GPP,$$

wherein HI represents a harvest index and the sum operator carries out the sum of the daily gross primary production value, $\Delta GPP$, over the vegetation period, wherein $t_1$ and $t_2$ may be determined as explained above.

In a further embodiment, the method of the current disclosure further comprises using the determined position dependent yield data in order to determine soil variations and long-term dynamics which affect the crop fertilizer requirements, which otherwise would remain hidden when determining the crop nutrient status. Areas which underperform or overperform consistently over at least a prior crop can help determining areas where the fertilization recommendation may be adjusted based on the current crop nutrient status and, optionally, a correction factor based on the determined biomass, as derived above from the remote data, and may be further adjusted based on the position dependent yield data.

The method of the current disclosure further comprises processing 1300 the yield data. In an embodiment, the method of the current disclosure comprises processing the yield data to obtain an absolute value of the position dependent yield data for a given pixel/location and is further adapted to determine a nutrient specific correction based on the absolute value of the position dependent yield data for the at least one prior crop for a given pixel. In a further embodiment, determining a nutrient specific correction based on the absolute value of the position dependent yield data may comprise a specific correction for phosphorus and potassium. Based on the amount of produced yield of at least one prior crop, it can be determined the amount of nutrients present in the harvested crop, and compensate the removal of said nutrients directly, for example, at the start of the season. This can be determined by means of a crop specific constant which relates the amount of yield obtained to the average nutrient present in that crop.

In an embodiment, processing 1300 the yield data to determine a nutrient specific correction comprises determining abnormal yield areas within the at least one agricultural field based on the yield data from the at least one prior crop season. Due to soil properties, recurring or not recurring weather events and/or pests, the yield of the agricultural field might differ within the agricultural field in a single season, but as well amongst different crop seasons. The current embodiment solves the problem of identifying said irregularities in the available yield data from previous crops, spotting the different disparities and adjusting the variable fertilizer recommendation based on it.

In an embodiment, the method of the current disclosure further comprises determining at least one reference yield value for at least a part of the agricultural field over at least one prior crop season. For example, determining a reference yield value may comprise determining at least a part of the agricultural field where the determined yield at the locations/pixels contained within that area are within a predefined threshold and defining an average of the position dependent yield data for the locations comprised within said at least one part of the agricultural field as the yield reference value for that part of the agricultural field. In a further embodiment, the method further comprises determining a plurality of reference yield values for a plurality of parts of the agricultural field. In a further embodiment, adjusting the fertilizer recommendation based on the difference between the reference yield value and the position dependent yield data comprises adjusting a nitrogen fertilization recommendation.

In a further embodiment, both approaches can be combined to obtain a nutrient specific fertilizer recommendation adjusted based on the absolute value of the yield data, as well as based on the difference between the determined yield for the at least one prior crop and the reference yield for that at least one part of the field. In this embodiment, REC (x, y) represents the adjusted fertilizer recommendation for position (x, y) within one region of the at least one agricultural field, wherein it can be expressed matrix-wise for the different nutrients (N, P, K) and wherein the recommendation would be as follows:

$$REC(x, y) = \begin{bmatrix} N_{REC}(x, y) \\ P_{REC}(x, y) \\ K_{REC}(x, y) \end{bmatrix} = REC_0(x, y) + REC_{Yield}(x, y) == \begin{bmatrix} N_0(x, y) \\ P_0(x, y) \\ K_0(x, y) \end{bmatrix} +$$

$$\begin{bmatrix} C_N \\ 0 \\ 0 \end{bmatrix} [Yield(x, y) - Yield_{REF}] + \begin{bmatrix} 0 \\ C_P \\ C_K \end{bmatrix} Yield(x, y)$$

In the above-described formula, $REC_0(x, y)$ represents the previously determined fertilizer recommendation, which could be expressed in the usual units of kg/ha or t/ha and be of a variable nature for the different positions within the agricultural field, or represent a constant value over the whole agricultural field, and the following terms correspond to the yield dependent adjustment for the different nutrients based on, in this order, the difference between the determined yield and the reference yield first and on the absolute value of the yield data. The different constants present in the above shown formula may be adjusted to crop variety, soil type and soil nutrient analysis and would be delivered in the same units as the provided fertilizer recommendation $REC_0$ While the above-displayed equation has been displayed for the sake of simplicity for one crop, yield data can represent the yield data from a plurality of crop seasons, wherein the reference yield may represent, as discussed in the current disclosure a reference yield for the one single prior crop for which the yield is determined or be computed over a plurality of crop seasons, having each crop season a different crop or not, or represent a weighted average taking into account the variation of the reference yield of the at least one part of the agricultural field with time, as it will be made clear.

In a further embodiment, the method is configured to received farm data regarding the application over prior crops of the specific nutrients. While Nitrogen content in soil is difficult to ascertain due to usual evaporation and leeching phenomena, presence of Phosphorus and Potassium in soil can be modelled with a mass conservation approach. As such, the method of the current disclosure may be further configured to received farm data related to the historic application of Phosphorus and Potassium and based on the absolute value of the position dependent yield data for the plurality of crops, establish a mass conservation equation, wherein the amount of Phosphorus and Potassium present in the soil is determined based on the nutrient removal as determined for the previous approach and the application of the specific nutrients over the plurality of prior crops. As such, following this embodiment, the equations shown above can be adapted as follows:

$$REC(x, y) = \begin{bmatrix} N_{REC}(x, y) \\ P_{REC}(x, y) \\ K_{REC}(x, y) \end{bmatrix} = REC_0(x, y) + REC_{Yield}(x, y) == \begin{bmatrix} N_0(x, y) \\ P_0(x, y) \\ K_0(x, y) \end{bmatrix} +$$

$$\begin{bmatrix} C_N \\ 0 \\ 0 \end{bmatrix}[\text{Yield}(x, y) - \text{Yield}_{REF}] + \sum \left\{ \begin{bmatrix} 0 \\ C_P \\ C_K \end{bmatrix} \text{Yield}(x, y) - \begin{bmatrix} 0 \\ m_P \\ m_K \end{bmatrix} \right\}.$$

As such, the modified term includes now the sum over a plurality of crop seasons and $m_P$ and $m_K$ represent the amount of phosphorus and potassium added in kg/ha or t/ha (if any) during the plurality of crop seasons for which the yield was determined.

As the above disclosed formula depicts, by the method of the current application a nutrient specific variable fertilizer recommendation can be achieved. Based on the areas which show a yield productivity which differ from the reference yield, a nitrogen content is adapted to improve the fertilizer recommendation. Such an approach takes into consideration soil variabilities, which finally influences the amount of fertilizer that the crop can absorb. Further, based on the absolute values of the yield produced in the at least one prior crop, a specific approach for P and K can be achieved, wherein the amount of P and K which was absorbed by the at least one previous crop is compensated.

While the above-mentioned formulas describe a continuous approach for the sake of simplicity, such a formula can be modified to have a stepwise variation of each of the Yield dependent terms, such that each nutrient is increased every time each of said yield values exceed a certain threshold to homogenize the amount of fertilizer to be spread. For example, for regions wherein $0.05*\text{Yield}_{REF}<[\text{Yield}(x, y)-\text{Yield}_{REF}]<0.2*\text{Yield}_{REF}$ a constant term can be determined which takes into account the up to 20% variation in yield within the same step. Furthermore, same approach can be envisaged for different values of said threshold. In further embodiments, the method is configured to establish said thresholds when the difference between the reference yield value and the position dependent yield data is comprised in particular between $0.1*\text{Yield}_{REF}<[\text{Yield}(x, y)-\text{Yield}_{REF}]<0.2*\text{Yield}_{REF}$, or between $0.01*\text{Yield}_{REF}<[\text{Yield}(x, y)-\text{Yield}_{REF}]<0.1*\text{Yield}_{REF}$, between $0.2*\text{Yield}_{REF}<[\text{Yield}(x, y)-\text{Yield}_{REF}]<0.3*\text{Yield}_{REF}$, wherein it should be specified that the equivalent ranges can be determined when the yield for a given position is below the reference yield for the at least one part of the agricultural field.

In a further embodiment, based on a soil nutrient analysis, the nutrient specific correction may be further adjusted based on the availability of different nutrients present in the soil of the at least one field. For example, in some countries guidelines are given which rank the soil nutrient level in different classes and the constant can be adjusted based on these classes. If the farmers have such soil analysis at hand or if it is already present in the field data, the method of the current disclosure may, based on the nutrient availability, increase or reduce the nutrient specific correction for the whole field or for a at least a part of it, if there are available soil analysis at different locations within the agricultural field.

In a further embodiment, determining at least one reference yield value may further comprise evaluating yield data from a plurality of prior crop seasons. As in previous embodiments, the current method may be configured to determine at least one reference yield value for at least a part of the agricultural field, but over a plurality of crop seasons. Due to the yield variation over the different crop seasons, the current method may further determine areas which performance is within a certain trend which can determine the deterioration of the specific areas. For example, due to lack of mineralization of appropriate fertilization procedures carried out in the past, fields might have been slowly depleted over the previous seasons. As such, if from the plurality of previous crop seasons a downward trend amongst the determined yield data can be ascertained for at least a part or a plurality of the agricultural field, the fertilization recommendation can be adjusted accordingly. In a further embodiment, the method of the current disclosure may then be configured to, after determining a season specific reference yield value for each of the prior crop seasons, determining the at least one reference yield value based on the season specific reference yield values.

Further, the current method may further comprise processing the at least one reference yield value in view of the weather data of previous and present crop seasons. The current method may be further configured to receive weather data and analyze the weather evolution over each of the prior crop seasons and establish a correlation with the weather of the present season and/or the weather forecast. Based on the correlation of the weather of prior crop seasons with the current crop's weather and/or the forecast, the reference yield values for the corresponding prior seasons can be adjusted correspondingly.

In another embodiment, the current method may be configured to determine abnormal areas related to pest events. The current method may be configured to determine abnormal areas wherein the reference yield of at least a part of the agricultural field is compared with the reference yield of the at least one part of the agricultural field over the remaining crop seasons. By determining parts of the agricultural field defined as abnormal areas which only happen in a single prior crop season, the current method is configured to disregard perturbances to the reference yields of each season which might have been cause by one-off events like pests, which have no causal relation to crop performance on different crop seasons. As such, the current method may be further configured to determine abnormal areas related to crop pest locations by comparing underperforming abnormal areas within a specific crop season with the same area over the remaining crop seasons. The current method may then be further configured to determine whether the computed abnormal area is defined as such in prior crop seasons. If no occurrence of an abnormal area is given, the current part of the agricultural field is labelled as crop pest and the yield reference value of the labelled part of the agricultural field is discarded from the computation of the yield reference value of the field for the corresponding crop season.

The method of the current disclosure further comprises determining a variable fertilizer recommendation for the at least one agricultural field based on the determined crop nutrient status and on the abnormal yield areas.

Once a variable and nutrient specific fertilizer recommendation for the agricultural field has been determined, the method of the current disclosure may be further configured to determine a suitable fertilizer mixture which best matches the recommendation. While fertigation or spraying approaches might allow a more flexible control of the individual nutrients, usually industrial fertilizers products are delivered with a fix mixture of the single nutrients. For example, amongst the usual YARA products, YaraRega range contains products with differing ratios of nitrogen, phosphorous and potassium. Solid industrial fertilizers usually present as well a fixed mixture of main and micronutrients. As such, in view of the fertilizer recommendation as provided by the method of the current disclosure, a further embodiment can be envisaged in which the appropriate selection of fertilizer product can be determined which would allow the most accurate dosage of fertilizer which best matches the proposed distribution in the fertilizer prescription map. As an example, FIG. 4 shows different examples of how such a determination can be presented to the user for a specific location within the agricultural field.

In a further embodiment, the method may be configured to determine an organic fertilizer product amount which can be added to the fertilizer recommendation in order to reduce the carbon footprint of the fertilizer application, thereby maintaining the nutrient levels at the level of the fertilizer recommendation. While the exclusive use of organic fertilizers is not excluded, there are as well limitations in its use imposed by national regulations and therefore a convenient determination of the amount which can be advantageously combined with another amount of mineral fertilizer improves the carbon footprint of the application while maintaining the high efficiency of it and keeping within the different regulations.

While for farmers convenience, the application might be a single event, it might be worth configuring a series of applications with different fertilizers based on the best suitable time frame for it, as well as weather conditions. As such, the problem would be then optimizing the same function wherein a plurality of fertilizers can be added to reach the finally desired amount of fertilizer, increasing the degrees of freedom and the precision of the fertilizer application. Moreover, based on weather data, the fertilizer recommendation and/or the fertilizer product, a suitable application date can be determined. For example, liquid fertilizers to be sprayed should not be applied on days with a wind over a certain threshold. Other cases can be derived from weather data, for example based on the occurrence of rain.

The method of the current disclosure may be further configured to produce a machine-readable script file for an agricultural apparatus to carry out the fertilizer application or to directly establish communication with an agricultural apparatus by means of dedicated networks. The farmers may be provided with a script file which can be directly downloaded or copied onto a storage device in order to be uploaded on the agricultural apparatus or provided directly by means of dedicated networks as mentioned above and configure the different settings of the agricultural apparatus based on the variable fertilizer application and, optionally, on the determined fertilizer product.

Although the process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product. While the foregoing describes various embodiments of the disclosure, other and further embodiments of the disclosure may be devised without departing from the basic scope thereof. The scope of the disclosure is determined by the claims that follow. The disclosure is not limited to the described embodiments, versions or examples, which are included to enable a person having ordinary skill in the art to make and use the disclosure when combined with information and knowledge available to the person having ordinary skill in the art.

While the use of plural nouns has been preferred throughout the disclosure when referring to persons (the users, the farmers) in order to allow a gender-neutral drafting of the text, there is hereby no limitation intended as to the number of persons which the current disclosure should be considered related to. This has been carried out in light of the amendments to the guidelines entered in force on $1^{st}$ of March 2021 supporting gender-neutrality and as an example for others.

While the present disclosure has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The disclosure in its broader aspects is therefore not limited to the specific details, representative apparatus and method, and illustrative example shown and described Accordingly, the detailed description thereof should not be construed as restrictive in all aspects but considered as illustrative. The scope of the disclosure should be determined by reasonable interpretation of the appended claims and all changes that come within the equivalent scope are included in the scope of the current disclosure.

The invention claimed is:

1. A computer-implemented method for providing a fertilizer recommendation for a crop, the method comprising the steps of:

a. determining at least one agricultural field comprising at least one crop;

b. determining a fertilizer recommendation for the at least one crop in the at least one agricultural field;

c. adjusting the fertilizer recommendation for the at least one agricultural field, wherein adjusting the fertilizer recommendation for the at least one agricultural field comprises:

i. receiving position dependent yield data of the agricultural field, wherein the yield data comprises yield data from at least one prior crop season from the at least one agricultural field, wherein receiving the position dependent yield data comprises:

a. receiving remote data comprising image data of the at least one agricultural field from the at least one prior crop season;

b. generating at least one vegetation index indicative of a crop nutrition status for the at least one prior crop season for each pixel of the image data over a predefined time;

c. processing the at least one vegetation index over the predefined time comprising: receiving historic weather data, wherein a daily gross primary production value of a crop is determined based on the at least one vegetation index generated and the historic weather data, wherein the position dependent yield is determined based on a sum of the daily gross primary production value between crop growth start and harvest time;

d. determining a position dependent yield for the at least one prior crop season based on the generated and processed vegetation index over the predefined time;

ii. processing the yield data to determine a nutrient specific correction for the fertilizer recommendation;

iii. adjusting the fertilizer recommendation based on the nutrient specific correction.

2. The method according to claim 1, wherein determining the fertilizer recommendation comprises obtaining the fertilizer recommendation by means of remote or local sensing.

3. The method according to claim 1, wherein the daily gross primary production value of the crop is determined by a following equation:

$$\Delta GPP = C_{RUE} * f_{apar} * C_{PAR} * f_T;$$

wherein $C_{RUE}$ is a constant representing a radiation use efficiency, $f_{apar}$ is a fraction of absorbed photosynthetic radiation determined as a function of existing chlorophyll pigments, $C_{PAR}$ represents incoming photosynthetic radiation, and $f_T$ represents a temperature efficiency factor.

4. The method according to claim 1, wherein processing the yield data further comprises determining abnormal yield areas within the at least one agricultural field based on the yield data, comprising:

i. determining at least one reference yield value for at least a part of the agricultural field, ii. comparing the position dependent yield data values with the at least one reference yield value, and iii. determining the areas wherein the position dependent yield data values differ from the at least one reference yield value for the at least a part of the agricultural field by a predetermined threshold;

wherein the method further comprises determining the nutrient specific correction based on the difference between the reference yield value and the position dependent yield data values.

5. The method according to claim 4, wherein determining the at least one reference yield value further comprises:

i. evaluating yield data from a plurality of prior crop seasons, ii. determining a season specific reference yield value for each of the prior crop seasons, and iii. determining the at least one reference yield value based on the season specific reference yield values.

6. The method according to claim 1, wherein determining the nutrient specific correction further comprises determining the nutrient specific correction based on an absolute value of the position dependent yield data for the at least one prior crop.

7. The method according to claim 6, wherein the adjusted fertilizer recommendation is expressed for the different nutrients N, P and K as follows:

$$REC(x, y) = \begin{bmatrix} N_{REC}(x, y) \\ P_{REC}(x, y) \\ K_{REC}(x, y) \end{bmatrix} = REC_0(x, y) + REC_{Yield}(x, y) == \begin{bmatrix} N_0(x, y) \\ P_0(x, y) \\ K_0(x, y) \end{bmatrix} +$$
$$\begin{bmatrix} C_N \\ 0 \\ 0 \end{bmatrix} [\text{Yield}(x, y) - \text{Yield}_{REF}] + \begin{bmatrix} 0 \\ C_P \\ C_K \end{bmatrix} \text{Yield}(x, y)$$

wherein $REC_0(x, y)$ represents a previously determined fertilizer recommendation.

8. The method according to claim 1, wherein determining the nutrient specific correction further comprises adjusting the nutrient specific correction based on a nutrient availability of different nutrients present in soil of the at least one field.

9. The method according to claim 1, wherein the method further comprises determining at least a fertilizer product based on the adjusted fertilizer recommendation.

10. The method according to claim 1, wherein the method further comprises producing a machine-readable script file based on the adjusted fertilizer recommendation for an agricultural apparatus to carry out a corresponding fertilizer application.

11. The method according to claim 1, wherein the method further comprises implementing the adjusted fertilizer recommendation by means of an agricultural apparatus configured to carry out a fertilizer application.

12. A system for providing a fertilizer recommendation comprising a device configured to carry out the method according to claim 1.

13. A data processing apparatus comprising means for carrying out the method of claim 1.

14. A computer-readable storage medium comprising instructions which, when executed by a computer system, cause the computer system to carry out the method of claim 1.

15. A computer program product comprising instructions which, when the program is executed by a computer, cause the computer to carry out the method of claim 1.

* * * * *